(12) United States Patent
Bower et al.

(10) Patent No.: US 10,892,540 B2
(45) Date of Patent: Jan. 12, 2021

(54) HIGH VOLTAGE ANTENNA PROTECTION DEVICE

(71) Applicant: QorTek, Inc., Williamsport, PA (US)

(72) Inventors: Gregory Bower, Jersey Shore, PA (US); Gareth J. Knowles, Williamsport, PA (US); Edward Almasy, Jersey Shore, PA (US); William M. Bradley, Lewisburg, PA (US); Matthew De Santis, Williamsport, PA (US)

( * ) Notice: Subject to any disclaimer, the term of this patent is extended or adjusted under 35 U.S.C. 154(b) by 404 days.

(21) Appl. No.: 15/860,444

(22) Filed: Jan. 2, 2018

(65) Prior Publication Data

US 2018/0219271 A1    Aug. 2, 2018

Related U.S. Application Data

(60) Provisional application No. 62/440,664, filed on Dec. 30, 2016.

(51) Int. Cl.
| | |
|---|---|
| H01Q 1/00 | (2006.01) |
| H04B 1/04 | (2006.01) |
| H01Q 1/50 | (2006.01) |
| G05F 1/571 | (2006.01) |
| H02H 7/20 | (2006.01) |

(52) U.S. Cl.
CPC .......... *H01Q 1/002* (2013.01); *G05F 1/571* (2013.01); *H01Q 1/50* (2013.01); *H04B 1/0466* (2013.01); *H02H 7/20* (2013.01)

(58) Field of Classification Search
CPC . H01Q 1/002; H01Q 1/50; H02H 7/20; H04B 1/0466
USPC .......................................... 361/56
See application file for complete search history.

(56) References Cited

U.S. PATENT DOCUMENTS

| | | | | |
|---|---|---|---|---|
| 2,342,310 | A | * | 2/1944 | Taylor .............. H01H 85/36 337/165 |
| 4,513,338 | A | | 4/1985 | Goodall et al. |
| 4,985,800 | A | | 1/1991 | Feldman et al. |
| 5,043,689 | A | * | 8/1991 | Di Troia ............ H01H 85/055 337/165 |
| 6,366,251 | B1 | | 4/2002 | Pokryvailo et al. |
| 6,657,150 | B1 | * | 12/2003 | Shea .................. H01H 3/3031 218/154 |
| 2005/0225491 | A1 | | 10/2005 | Martek et al. |
| 2010/0033388 | A1 | | 2/2010 | Miller et al. |
| 2012/0286905 | A1 | * | 11/2012 | Reuber ............. H01H 33/6662 335/20 |

FOREIGN PATENT DOCUMENTS

WO    2014107115 A1    7/2014

* cited by examiner

*Primary Examiner* — Kevin J Comber
(74) *Attorney, Agent, or Firm* — Cahn & Samuels, LLP

(57) ABSTRACT

A voltage interrupt device is provided transmits or conducts signals in the RF frequency range but stops all signal transmission when subject to a high energy, low frequency signal such as that generated when the antenna strikes a power line, for example, signals less than or equal to 200 MHz and greater than or equal to 600V.

19 Claims, 10 Drawing Sheets

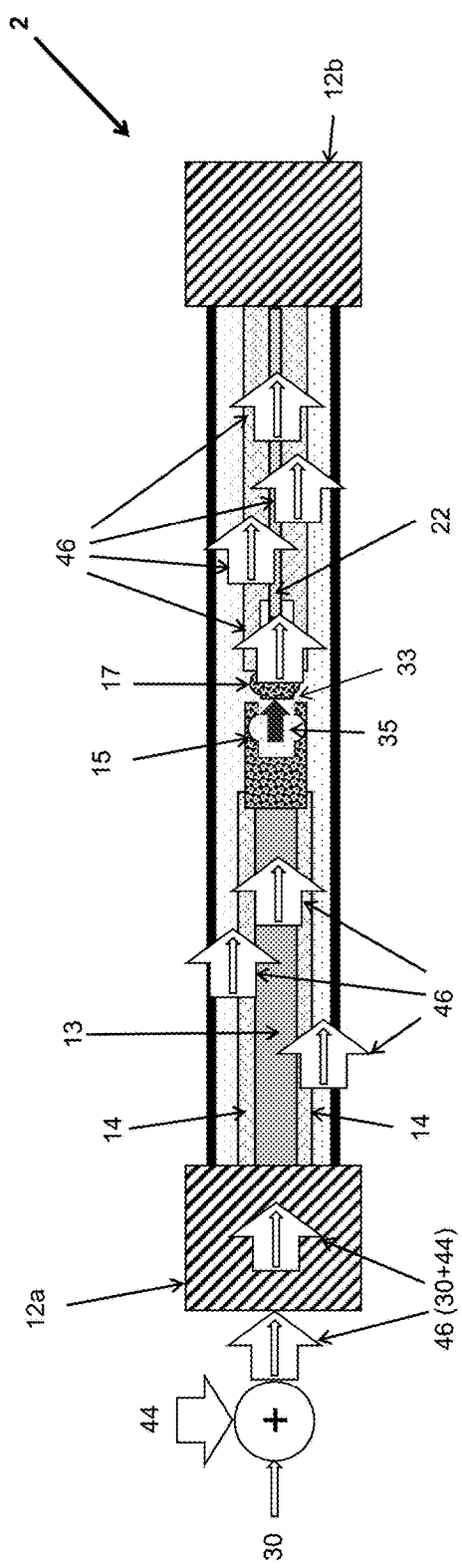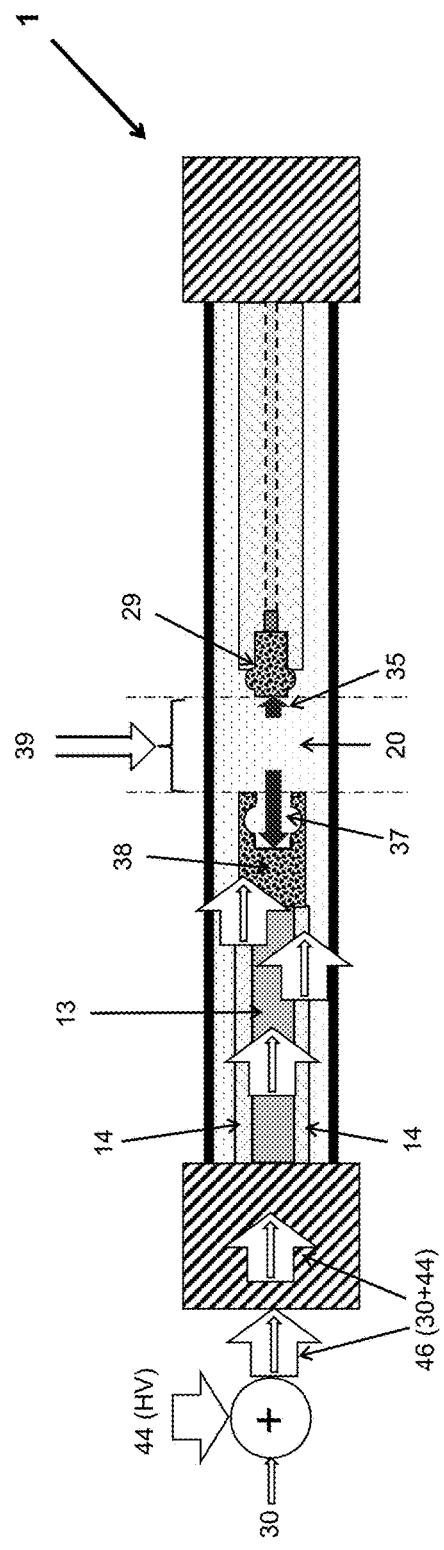
FIG. 2A
FIG. 2B

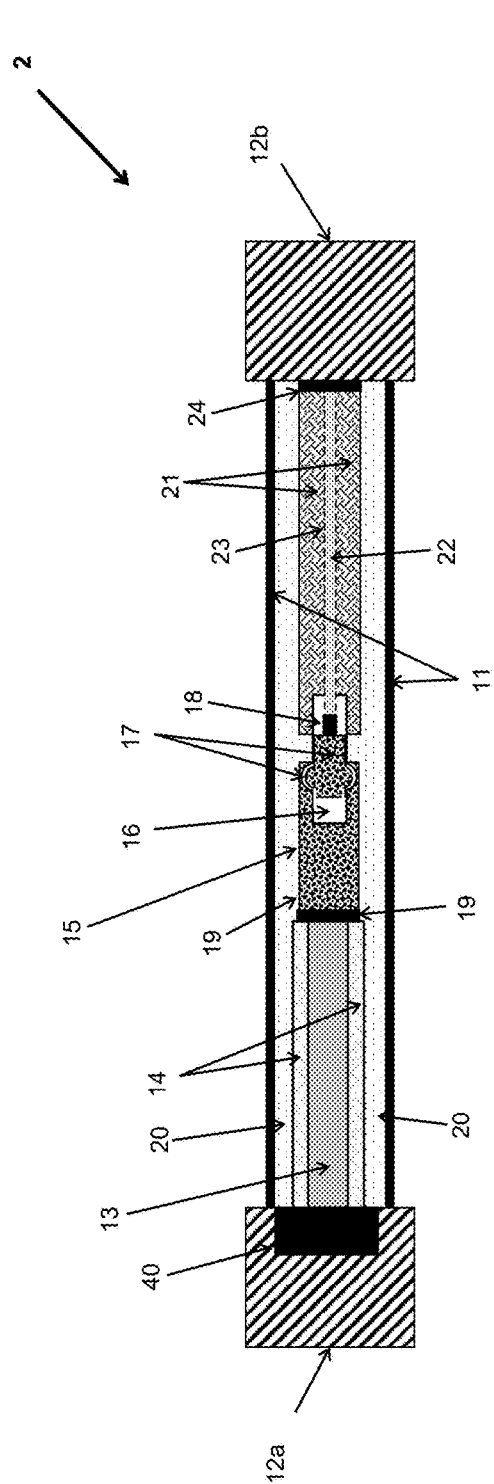
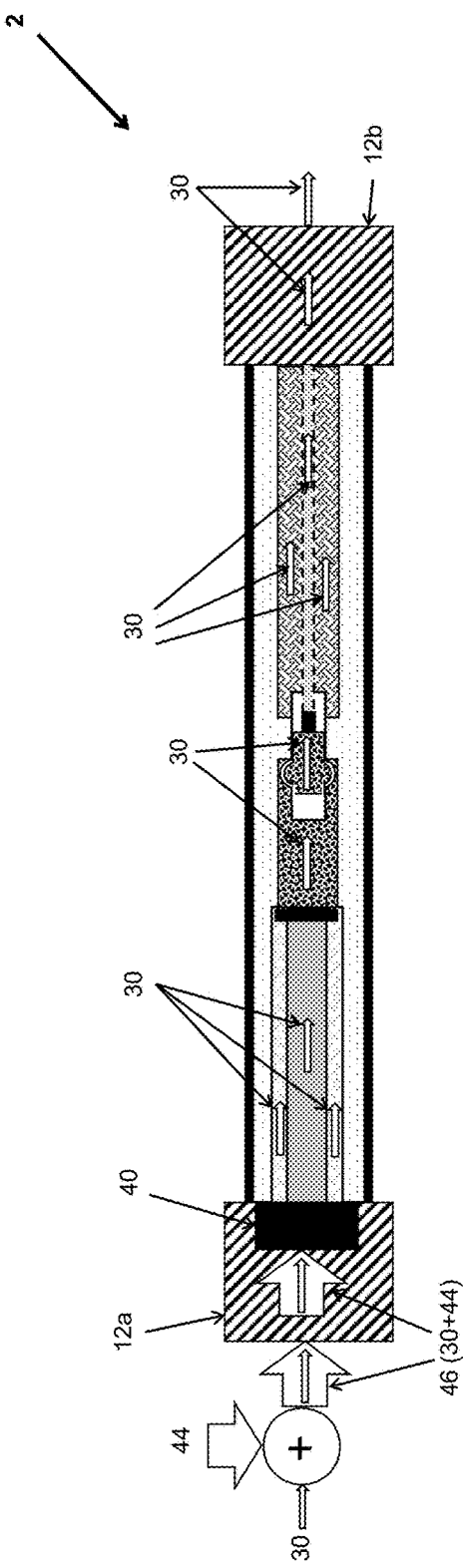
FIG. 3A
FIG. 3B

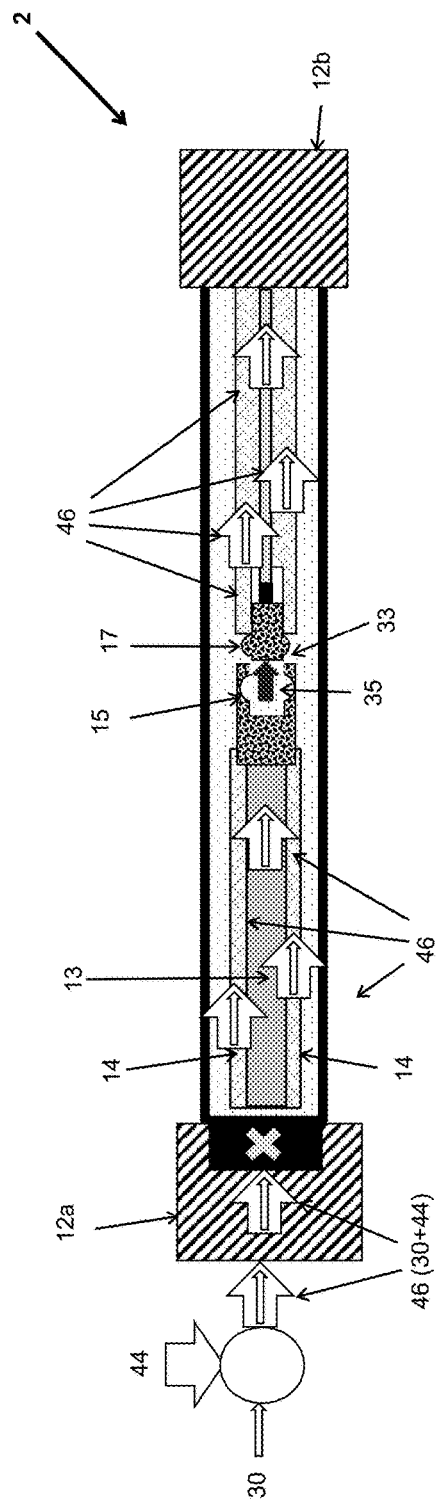
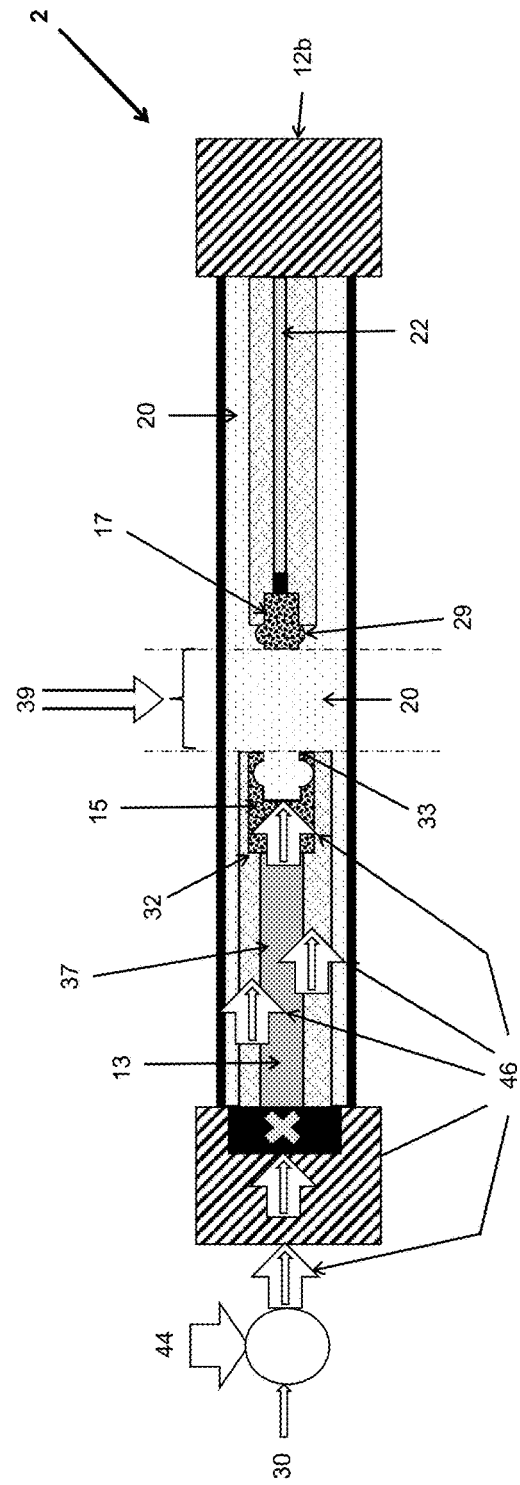
FIG. 3C
FIG. 3D

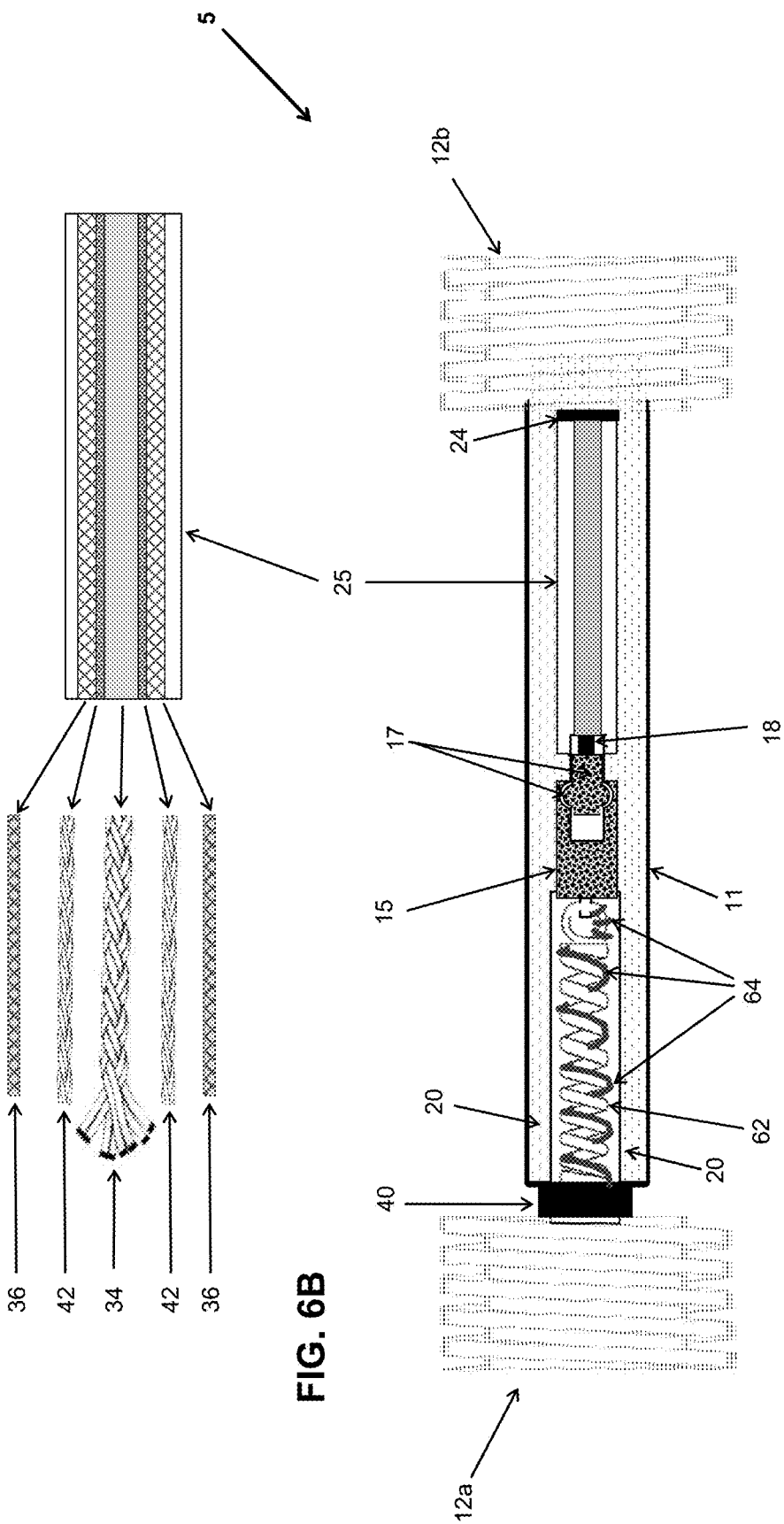

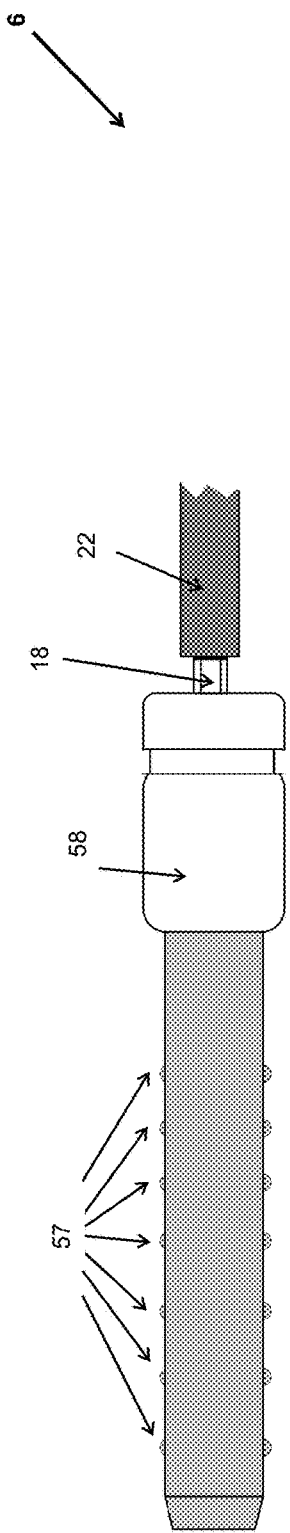
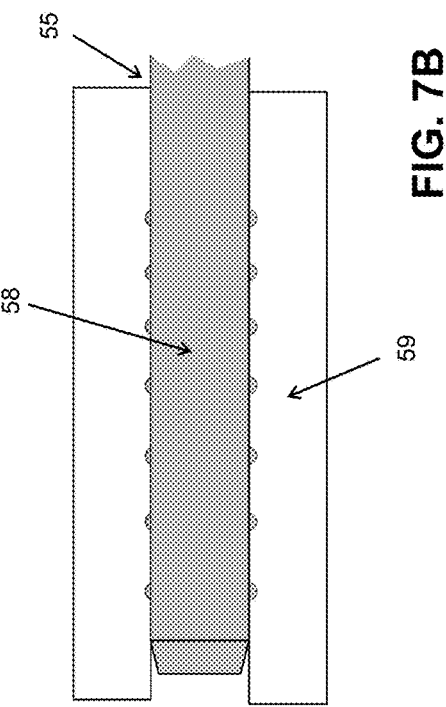
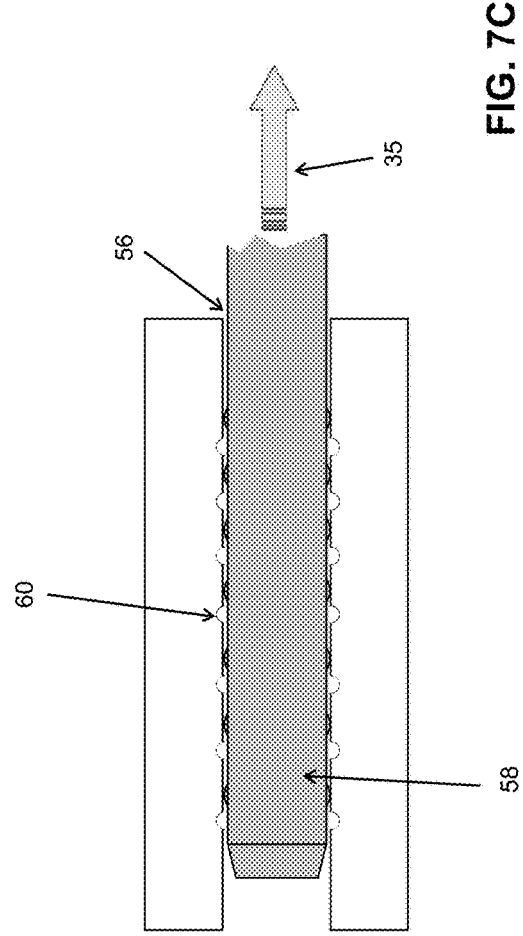
FIG. 7A
FIG. 7B
FIG. 7C

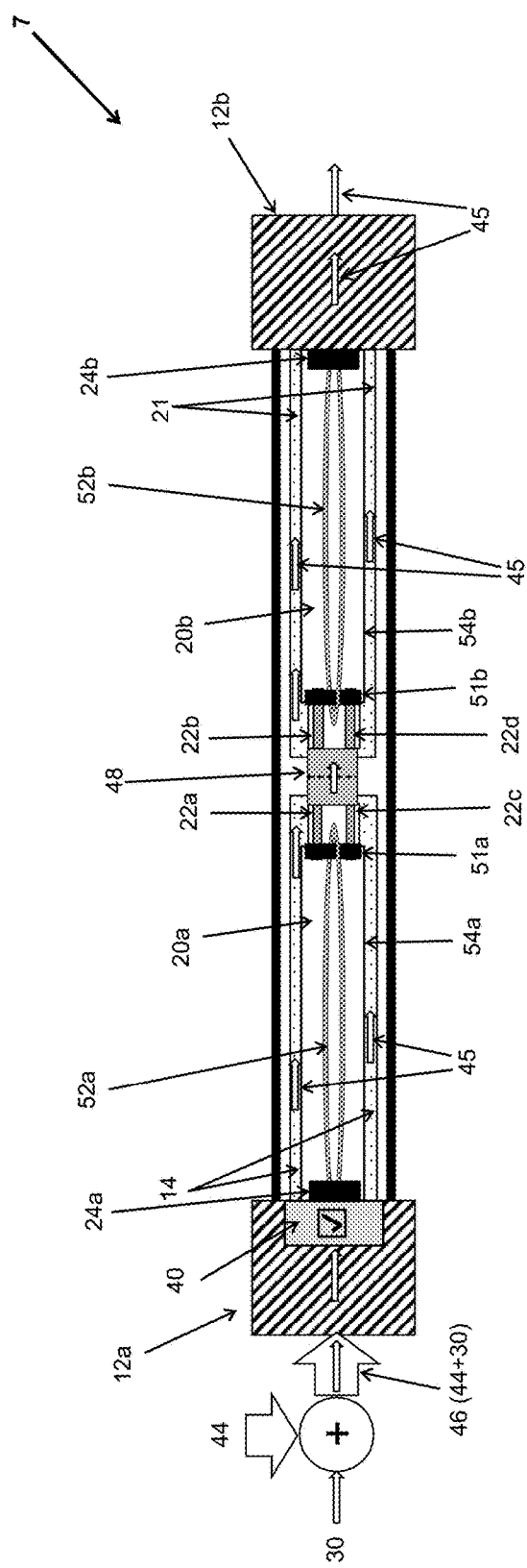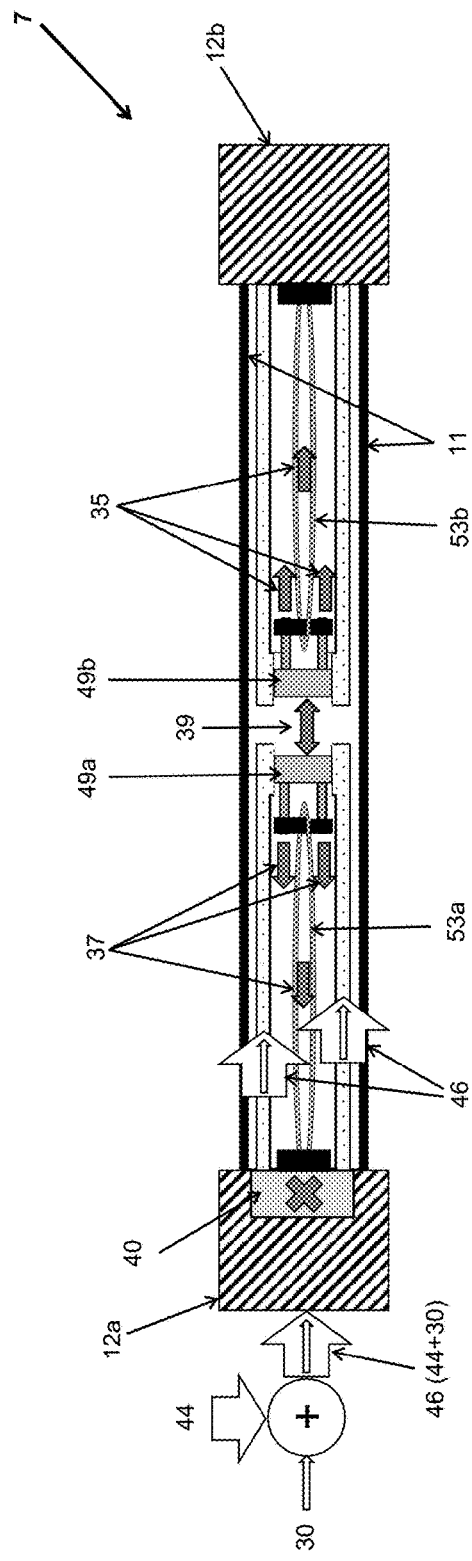

HIGH VOLTAGE ANTENNA PROTECTION DEVICE

This application claims the benefit of U.S. provisional Application Ser. No. 62/440,664, filed Dec. 30, 2016, which is hereby incorporated by reference.

This invention was made with government support under Contract No. M67854-16-C-6515 awarded by the United States Marine Corps System Command. The government has certain rights in the invention.

FIELD OF THE INVENTION

The present invention relates to protective devices for antennae. More particularly, the present invention relates to an antenna component that provides high voltage protection by breaking the antenna signal path.

BACKGROUND

The invention addresses the issue of user or equipment (transceiver) safety in the event of accidental contact with low-slung power lines. Lethal levels of electrical exposure may result to the user or equipment in the event of such an accidental or unavoidable contact event.

There are several known designs that address the issue of accidental contact with power lines. However, the prior art known to the inventors is not designed for use where a human user is directly in the primary electrical path. In such circumstance, a protection device should protect a user in all conditions as to prevent the user experiencing any lethal levels of low frequency high voltage and/or high current to thereby avoid injury and/or electrocution. That is, the device must should ensure that the user experiences at worst an AC-2, i.e. a 'perceptible only' level of electrical discomfort, during any low frequency high voltage and/or high current onset event thereby preventing an electrocution hazard. As such, in distinction to known prior art devices, speed is crucial. Prior art retraction mechanisms known to the present inventors are simply too slow and fail to provide an electrical path disconnect speed needed to ensure guaranteed AC-2 operation.

SUMMARY OF THE INVENTION

The invention provides a voltage interrupt assembly for a conductive device such as an antenna. The voltage interrupt device transmits or conducts signals in the RF frequency range but stops all signal transmission when subject to a high energy, low frequency signal such as that generated when the antenna strikes a power line, for example, signals less than or equal to 200 MHz and greater than or equal to 600V.

In one embodiment, the invention a first conductive endcap and a second conductive end cap axially displaced from the first conductive endcap. A conductive latching mechanism is disposed between the first and second end caps. A conductive connector is electrically connected to the first end cap at a first end and to the latching mechanism at a second end. A pre-tensioned retraction mechanism is lodged between the first end cap and the latching mechanism. A release actuator is lodged between the latching mechanism and the second end cap. A conductive flange disposed about said release actuator, the conductive flange is electrically connected to the latching mechanism and the second end cap and the conductive flange allows substantially unimpeded freedom of axial motion of the release actuator.

BRIEF DESCRIPTION OF THE DRAWINGS

FIG. 2A shows a cross-section of the axial mechanical path of voltage interrupt assembly in accordance with an embodiment of the invention immediately following the onset of a high voltage or high current event.

FIG. 2B depicts a cross-section indicating the axial electrical transmission path of a voltage interrupt assembly in accordance with an embodiment of the invention immediately following the onset of a high voltage or high current event. It illustrates how such onset causes a large insulation gap to be formed across what was the electrical path. It further shows how low dielectric gas or air immediately fills any insulation gap in the electrical path created due to the mechanical and energized retractions.

FIG. 3A shows a cross-section of the axial mechanical path of a voltage interrupt assembly of the invention that additionally incorporates a high voltage blocking capacitor prior to any onset high voltage or high current event. It illustrates the in-line axial insertion design of the blocking capacitor.

FIG. 3B shows a cross-section showing the axial electrical transmission path of a voltage interrupt assembly in accordance with an embodiment of the invention including a blocking capacitor that acts to prevent transmission to any excessive current or voltage along the former electrical path to the limits of the capacitor rating.

FIG. 3C shows a cross-section of a voltage interrupt assembly in accordance with the invention indicating the initial response to a high power signal that exceeds the rating of an in-line high frequency high voltage blocking filter capacitor.

FIG. 3D shows a cross-section o6 a voltage interrupt assembly in accordance with the invention indicating the steady-state response to a high power signal that exceeds the rating of an in-line high frequency high voltage blocking filter capacitor. In particular, FIG. 3D illustrates the formation of a large electrical insulation gap.

FIG. 6A a cross-section of an embodiment of a voltage interrupt assembly of FIG. 5.

FIG. 6B depicts an exploded view of a cylindrical housing of the voltage interrupt assembly of FIG. 6A.

FIG. 7A shows an embodiment of a lock pin barrel of a voltage interrupt locking/latching mechanism including a number of very small protrusions.

FIG. 7B illustrates an embodiment of a lock pin barrel of a voltage interrupt locking/latching mechanism including a number of very small protrusions and mated with corresponding cavities as to enable a low force distributed arrangement.

FIG. 7C depicts an embodiment of a lock pin barrel of a voltage interrupt locking/latching mechanism including a number of very small protrusions offset from corresponding cavities.

FIG. 8A shows a cross-section of a voltage interrupt assembly in accordance with the invention where a primary actuator consists of an opposing pair of flexbands.

FIG. 8B shows a cross-section of a voltage interrupt assembly in accordance with the invention that shows the dual flexband electrical and mechanical behavior subsequent to an onset high energy event that exceeds its in-line high voltage blocking capacitor rating.

DETAILED DESCRIPTION OF THE EMBODIMENTS

The voltage interrupt assembly of the present invention provides an entirely passive mechanism that normally conducts RF or other high frequency signals but that can near-instantaneously interrupt the electrical path should an antenna or other mechanism to which it is installed come into contact with a low frequency high voltage or high current source. The voltage interrupt assembly can be used as an in-line voltage interrupt device that can be quickly installed or disconnected to, e.g., an antenna, and that can provide a reliable safety feature for user and equipment even if exposed to high voltage contact of tens to hundreds of kV. In accordance with the invention, the RF performance of an antenna or other device to be voltage protected to which the voltage interrupt assembly of the invention is installed is substantially the same as the RF performance when the voltage interrupt assembly is removed. With the device of the invention installed, at worst a user would be subject to an AC-2 'perceptible only' level of electrical discomfort during any inadvertent contact of the antenna with high voltage and/or high current source, i.e., a source operating at up to 35 kV or more and operating at up to 200 Hz.

Figure 1A:
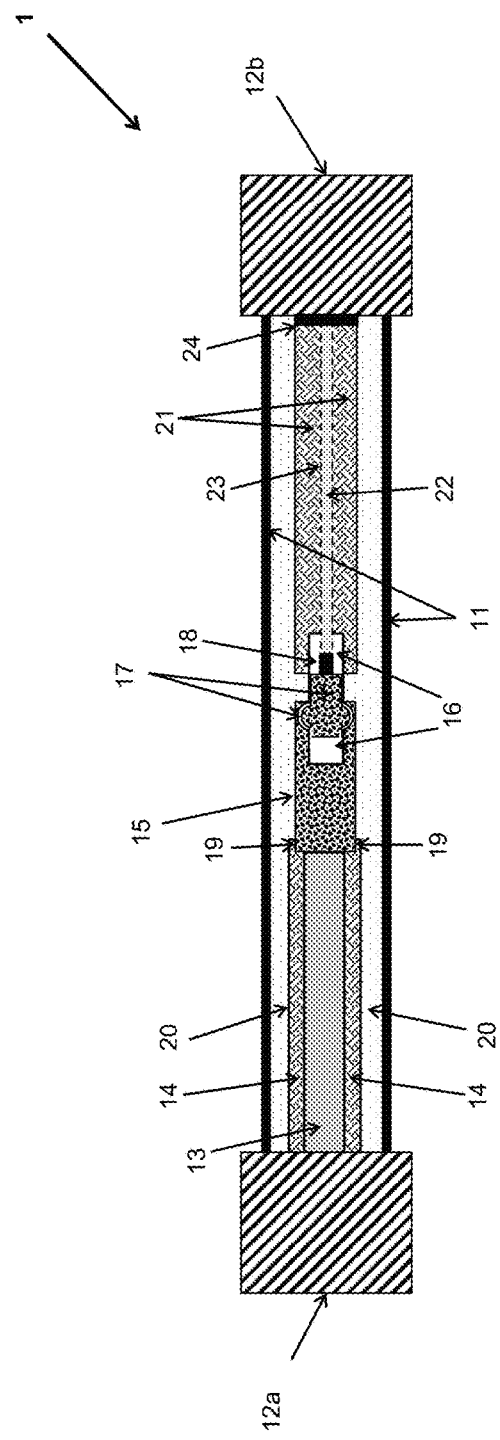
FIG. 1A shows a cross-section of the axial mechanical path of voltage interrupt assembly in accordance with an embodiment of the invention prior to any onset high voltage or high current event.

Turning to the drawings, FIG. 1A depicts a voltage interrupt assembly 1 in accordance with the invention that provides for an axial electrical conduction path from a conductive endcap 12a to a conductive endcap 12b. The components that form the axial electrical conduction path between endcaps 12a and 12b are installed in an insulated housing, or casing, 11. Conductive connector 14 mechanically and electrically terminates at the endcap 12a at one end and similarly terminates at the receiver barrel 15 at its other end as to form a cavity 20. A passive pre-tensioned large displacement retraction mechanism 13 referred to as the primary actuator, may be disposed within cavity 20. The electrical connector 14 is designed in a manner that ensures minimal loss of any high frequency electrical signal transmission. It is further designed as to provide strain relief at its mechanical connection point 19 to latching mechanism 31. In accordance with an aspect of the invention, latching mechanism 31 comprises a mechanical structure having first and second interlocking members. In some embodiments, the first member includes a receiving barrel 15 and the second member includes a ball lock pin 17. Receiving barrel 15 and ball lock pin 17 may form a releasable interlocking connection such as a ball and socket.

In some embodiments, the retraction mechanism 13 is at one end connected to the endcap 12a and at the other end connected to a receiver barrel 15. The initial state of the retraction mechanism 13 is that it is placed under tension and cannot release the tension as it is forcibly captured at both ends by endcap 12a and receiver barrel 15. Intimate contact mating of electrical connector 14 with the receiver barrel 15 assures that there is a very good electrical transmission path traversing axially from the endcap 12a, through receiver barrel 15 and on through ball lock pin 17. It further ensures that the primary actuator 13's pre-tension force cannot be relieved as ball lock pin 17 itself is rigidly captured by 12b via the connecting high force/small displacement release actuation mechanism 22. A hollow cavity 16 extends into a conductive flange 21 that also mechanically and electrically terminates at the endcap 12b. Cavity 16 is designed as to allow for unimpeded retraction of the ball lock pin assembly 17 in axial direction towards endcap 12b upon significant enough force being applied in that direction as to retract 17 from its locked position within barrel 15. Flange 21 is comprised of a conductive material as to form a housing, or casing surrounding release actuation mechanism 22 that is mechanically and electrically connected at one end to ball lock pin release connection collar 18 and at the other end mechanically and electrically connected either directly to end to endcap 12b or to an interposed conduction material 24 which itself is connected to endcap 12b. Ball lock pin release connection collar 18 is preferably comprised of a low loss conductive material at high frequencies such as copper or highly conductive metal. Release actuator 22 is also fixedly connected to latching mechanism 31 either directly to ball lock pin assembly 17 or to ball lock pin release connection collar 18 which itself is connected to ball lock pin assembly 17. Release actuator 22 is designed to apply a retraction force in the direction of end cap 12b in response to coming in direct contact with a suitably selected signal such as a signal having a frequency of 200 Hz or less and a voltage of at least 600V or greater, or, in some embodiments, between 600V and 35 kV. The conductive flange housing 21 is configured to allow unimpeded freedom of axial motion of release actuator 22. In some embodiments, a low friction material or other additive 23 may be provided along the length of release actuator 22 to lower any opposition to rapid retraction of release actuator 22. In keeping with the invention, low friction material 23 may form a second interior housing around release actuator 22 and is comprised of conductive material that is inserted within flange 21. Low friction material 23 may be conductive or non-conductive. In some embodiments, low friction material 23 forms a housing that completely encapsulate 22.

In some embodiments, voltage interrupt assembly 1 is uniaxial along a length between endcaps 12a and 12b. The unused volume inside the insulated housing/casing 11 may be filled with air or with a gas having a higher dielectric strength than air. Note that the locking force which maintains receiver barrel 15 in engagement with ball lock pin 17 is sufficient to prevent retraction of primary retraction mechanism 13 which is now held statically in tension.

Figure 1B:
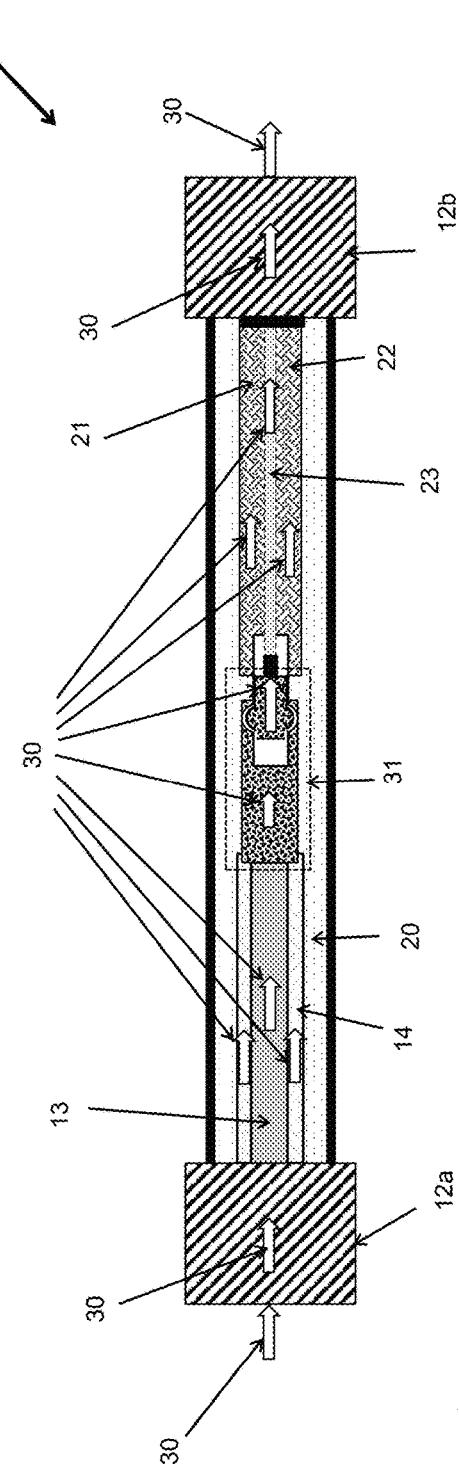
FIG. 1B illustrates a cross-section showing the axial electrical transmission path of a voltage interrupt assembly in accordance with an embodiment of the invention prior to any onset high voltage or high current event.

As can be seen in the axial electrical transmission path along the length of voltage interrupt assembly 1 as indicated in FIG. 1B, due to the endcap 12a being electrically conductive, any low power electrical signal, such as an RF signal 30 originating at the endcap 12a will pass through endcap 12a into the electrical connector 14 and also into the retraction mechanism 13 if it is selected as conductive. The primary conduction path for the transmission signal 30 is provided by retraction mechanism 13 and conductive connector 14. However, retraction mechanism 13 only contributes negligible conduction of high frequency signals. In some embodiments, a non-conductive coating is applied to retraction mechanism 13 as to render retraction mechanism nonconductive or inert during normal operation. Because receiver barrel 15 is comprised of conductive material designed for low loss of high frequency signal content, i.e., RF signals between 3 MHz and 440 MHz, source signal 30 efficiently propagates through receiver barrel 15. In some embodiments, receiver barrel 15 may be designed to both provide for low loss transmission and doubly function as a bandpass filter. For example, receiver barrel 15 can be constructed from a low-loss material such as copper or silver plated to provide efficient high frequency transmission. In addition, the design of the receiver barrel 15 (such as length) can be optimized to provide the large gap when the receiver barrel 15 and ball lock pin 17 are separated as well as additional high frequency filtering. Ball lock pin 17 may be similarly comprised of material exhibiting low loss at high frequencies. In keeping with the invention, receiver barrel 15 and ball lock pin 17 may be constructed of identical materials as to ensure comparable coefficients of thermal expansion to maintain a tight lock fit over wide thermal variation. In normal operation ball lock pin 17 is interlocked with receiver barrel 15 enabling signal 30 to efficiently transmit axially along electrical conduction flange 21. Because a conductive connection collar 18 is directly coupled to release actuator 22, signal 30 will also nominally conduct axially through release actuator 22. Because conduction flange 21 and release actuator 22 both terminate at conductive endcap 12b, signal 30 will transmit to the far side of 12b as to complete and end-to-end conduction of externally generated signal 30 along the entire length of voltage interrupt assembly 1 in an efficient low loss manner.

In accordance with an aspect of the invention, latching mechanism 31 may be realized by any suitable axially conductive locking mechanism such as a friction lock or screw lock without affecting the loss and efficiency performance of voltage interrupt assembly 1 or the pre-tension force applied to primary actuator 13.

When voltage interrupt assembly 1 comes directly or indirectly electrically into contact with a low frequency high energy source, such as contact with a high voltage electrical cable, the resultant signal generated from that contact, high energy input signal 44, will concatenate with any input high frequency antenna (frequency greater than 3 MHz) signal 30 typically between 3 MHz and 440 MHz, as to form device input signal 46. If there are no high frequency antennae signal 30 during this high energy contact event then device input signal 46 equals high energy input signal 44.

As shown in FIG. 2A, device input signal 46 follows the same electrical path across voltage interrupt assembly 1 as described previously. Importantly, the release actuator 22 is subject to this high energy signal propagation. Release actuator 22 is subject to a large contraction force 35 responsive to receipt of device input signal 46 causing it to contract in the direction of endcap 12b. The contraction of release actuator 22 pulls ball lock pin assembly 17 towards endcap 12a with sufficient force to disengage ball lock pin assembly 17 from receiver barrel actuator 15 and to displace ball lock pin 17 by a distance substantially equal to the magnitude of the contraction of release actuator 22. Accordingly, a small physical gap is created between receiver barrel 15 and ball lock pin 17. In keeping with an aspect of the invention, the release of latching mechanism 31 eliminates the locking force that was applied to primary actuator 13 by latching mechanism 31 via its tensioned connection to receiver barrel 15. Accordingly, primary actuator 13 is subject to a recovery force and, as shown in FIG. 2B, experiences a large axial displacement (retraction) in the direction of endcap 12a. Because an end of primary actuator 13 is connected to receiver barrel 15, and latching mechanism 31 is in a released state, receiver barrel 15 is displaced in the direction of endcap 12a by a magnitude substantially equal to the displacement of primary actuator 13. The axial displacement 35 of release actuator 22 and the axial displacement 37 of primary actuator 13 both shown in FIG. 2B act in opposite axial directions to create a large insulation gap 39 between receiver barrel 15 and the ball lock pin mechanism 17. As the gap expands it is immediately filled by entrained gas or air 20 which is contained in housing 11. The device input signal 46 wants to conduct axially along the voltage interrupt assembly. However, device input signal 46 is blocked by the effective open circuit condition created by insulation gap 39. In some embodiments, insulation gap 39 is set to be larger than the arc capability for any expected maximum value that device input signal 46 can achieve to bridge insulation gap 39.

Note that there is no active part to voltage interrupt assembly 1 as described in this embodiment. It is an entirety a passive mechanism. The sole means for activation as to create an open circuit condition in the electrical path to occur is receipt of high energy input signal 44. When there is no high energy input component to device input signal 46, the voltage interrupt assembly of the invention acts as a high efficiency low loss in-line installable high frequency, such as RF band, component. Its simplicity and simple uniaxial design also lends itself to low cost manufacture.

In order to minimize the trigger activation of the voltage interrupt mechanism 1 in response to any random high energization events, the present invention can be modified as to include an in-line low frequency blocking device/high pass filter 40, such as a capacitor, as shown in FIG. 3A. The purpose of high pass filter 40 is to provide a passive pre-protection stage that does not normally have to be replaced and that prevents low frequency signals that may have high voltage and/or high current content from transmission into the body of the voltage interrupt assembly beyond or downstream from high pass filter 40. Because high pass filter 40 only blocks low frequency signals, it is invisible to high frequency signals such as RF transmission signals.

FIG. 3B illustrates the normal electrical transmission path of voltage interrupt assembly 2 where high pass filter 40 comprises an installed in-line high voltage blocking capacitor. Device input signal 46 transmits through endcap 12a to low frequency high pass filter 40. Provided that device input signal 46 is less than high pass filter 40's capacitor rating, high pass filter 40 will prevent any transmission of the low frequency component 44 of device input signal 46 while freely allowing transmission of the high frequency component 30.

FIG. 3C shows the initial response when the low frequency component 44 exceeds the capacitor rating of high pass filter 40. As with the voltage interrupt assembly without the added high pass filter 40, high energy input signal 44 initially causes the release of ball lock pin assembly 31 causing a small gap between receiver barrel 15 and ball lock pin 17 to occur. As with the voltage interrupt assembly without the added capacitor 40, the release of latching mechanism 31 will allow for the primary actuator 13 to recover from its pre-tension state as to form a large insulation gap 39 shown in FIG. 3D.

Figure 4:
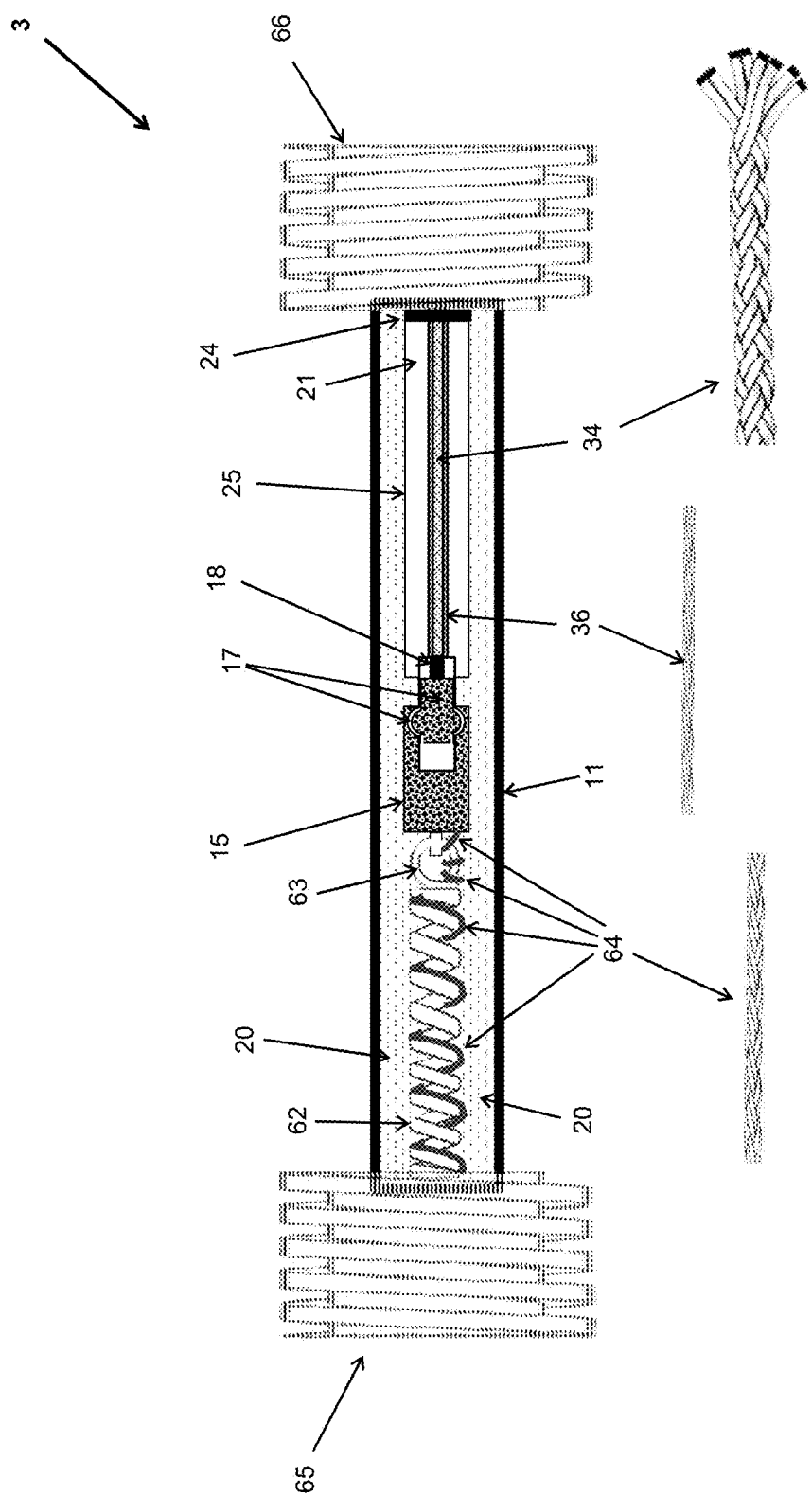
FIG. 4 shows a cross-section of a voltage interrupt assembly in accordance with the invention showing additive accelerant incorporated into the high force/small displacement release actuator.
Figure 5:
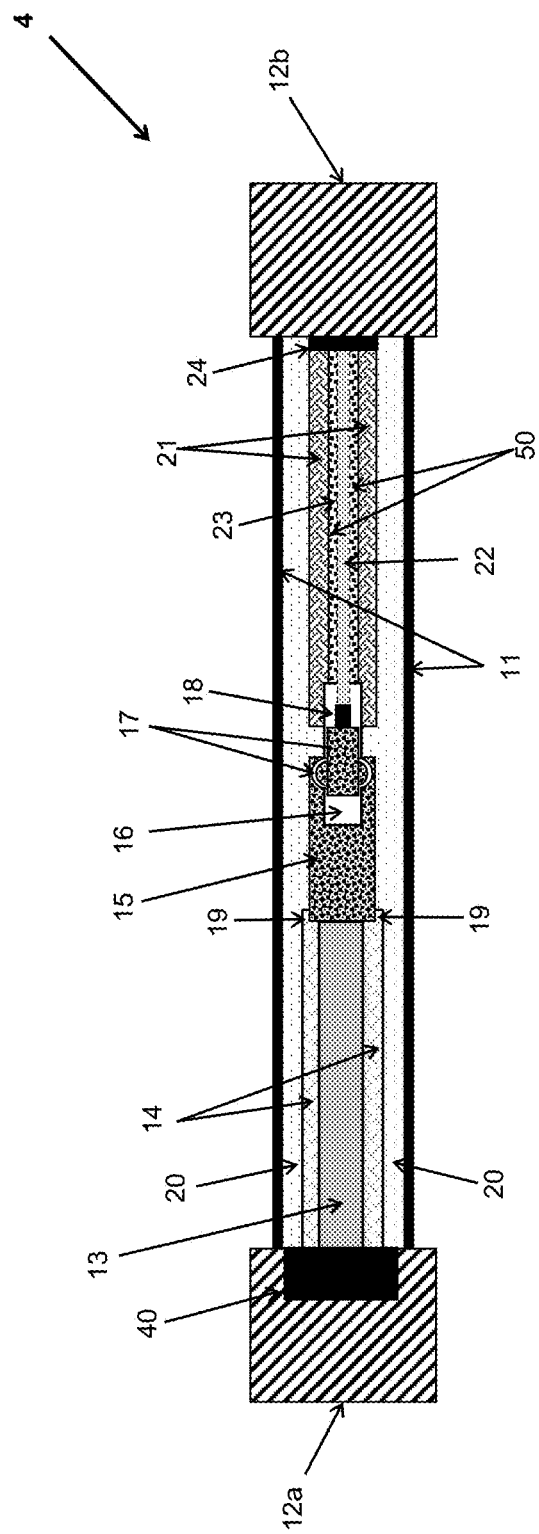
FIG. 5 shows an embodiment of a voltage interrupt assembly in accordance with the invention where a high force/small displacement release actuator includes a braided and looped shape memory cable, the primary actuator is a steel spring, the primary electrical pathway from the left endcap to the ball lock pin mechanism capture barrel is a loosely wound copper braid, and the endcaps are designed as screw-type fittings.

In accordance with another embodiment, the present invention employs a uniaxial shape memory device to realize a small high force/small displacement release actuation mechanism as shown in FIGS. 4 and 5. In keeping with the invention, a pre-tensioned metal spring 62 is attached to receiver barrel 15 via a metal eyelet 63 which is itself rigidly attached to receiver barrel 15. A loosely wound copper braid 64 is also connected between endcap 12*a* and metal eyelet 63 as to act as the primary RF signal path. The spring 62, eyelet 63, and copper braid 64 are all contained within a conductive metal housing 14 configured as to allow for free motion of receiver barrel 15 in the direction of end cap 65 in the event of release of latching mechanism 31. A hollow cylindrical housing 25 is provided that cinches onto a cable connection 18 to provide a mechanical and electrical connection between ball lock pin 17 and conductive attachment 24. Cylindrical housing 25 holds a braided shape memory alloy 34 that has a transition temperature Ts, and braided copper conduction wire 36 comprising conductive flange 21. Braids 34 and 36 can either be separate or mutually intertwined into a single braid. In some embodiments, braids 34 are looped through attachment 24 as to form a double loop between ball lock pin 17 and conductive attachment 24. The shape memory alloy forming this loop is trained prior to installation as to shrink in overall length should its temperature exceeds Ts. Both shape memory alloy 34 and conduction wire 36 allow for free motion of ball lock pin 17 towards endcap 66 upon release of latching mechanism 31. As illustrated in FIG. 4, communication equipment endcap 65 and transceiver connection endcap 66 are here designed as to allow for rapid screw-in or unscrew from, e.g., an antenna or other external communication equipment. The endcap 65 along with steel spring 62, receiver barrel 15, ball lock pin 17, double loop braid 34, and endcap 66 form a continuous axial conduction path that, during normal operation, will allow for high frequency source signals, such as RF band signals, to propagate along its length. A signal is generated in shape memory alloy 34 due to the resistivity of the material and its design responsive to receipt of a high energy signal 44. Continued application of the induced signal will cause shape memory alloy 34 to eventually increase in temperature to where it finally crosses its temperature transition point Ts, upon which moment the shape memory alloy will change state and undergo near instantaneous shrinkage in length. The near instantaneous shrinkage of length ΔL of the looped braid alloy 34 between ball lock pin 17 and 24 will cause a large axial force Y to act on ball lock pin 17. The braided alloy 34 is designed so that this force Y acting on ball lock pin 17 is sufficient to disconnect latching mechanism 31. Release of latching mechanism 31 allows the steel spring 62 to recover to its original length by an amount ΔS. Because displacements ΔL and ΔS occur in opposite axial directions this causes an insulation gap 39 of length ΔL+ΔS. Provided the materials and sizing are correctly selected, insulation gap length ΔL+ΔS thus created will be greater than the arc capability for any potential high voltage and/or high current in the design range. Correctly selecting the materials and their sizing can ensure that the response to any excessive voltage or current loading resulting from contact with a high voltage source will be sufficient to create an insulation gap 39 sufficiently large as to prevent any energy flow, including any arcing potential, to occur.

To improve response time, an accelerant 50 is employed in the voltage interrupt assembly of the present invention. As illustrated in FIG. 5, an accelerant material may be cladded to, or closely co-located with, the release actuator 22. In keeping with an aspect of the invention, accelerant 50 is normally inert and can only be triggered in the presence of an excessive energization signal. Nanofoil powder is a suitable accelerant. Following engineering practice, the safety factor would usually be selected to be greater than 50% of maximum rating. In this case the maximum rating being set by the rating performance of the selected in-line high pass filter capacitor 40. Capacitor 40 prohibits any unintended activation of the accelerant until any unexpected energy surge occurrence that must now be at least double the safety rating. That is, accelerant 50 is inert under all normal operating conditions as to include military specified temperature (−45° C. to 125° C.) variations and any mechanical disturbances until such time as an electrical energization event occurs that is above the maximum capacitor rating of high pass filter 40. When such an excessive energy signal event is encountered, the accelerant 50 now acts to dramatically increase the rate at which the release actuator 22 is activated. Cylindrical housing 25 acts to concentrate the energy produced by the accelerant directly into a reactive retraction mechanism as to drastically reduce its excitation time constant.

In accordance with sill another embodiment, illustrated in FIG. 6 cylindrical housing 25 of encloses a shape memory release actuator 34 and high frequency conduction material 36 wherein there is disposed an interposed additive 42 between 34 and 36. Said additive consists of a minute amount NanoFoil powder. NanoFoil powder does not produce any gas emission when activated by an excessive electrical event. This quantity of additive needed to initiate state transition of release actuator 22 can be directly calculated using the length, diameter, and cross-sectional area of the wire alloy of which release actuator 22 is comprised. Following engineering practice, the safety factor for pyrotechnic transition of the additive would be selected to be greater than 50% of maximum rating. In this case the maximum rating of merit being set by the maximum rating selection of the in-line high pass filter 40.

By correctly selecting the composition and amount of alloy 42 that clads shape memory allow 34 it can be so designed that it will require at least 50% or more of the maximum capacitor rating of high pass filter 40 to initiate its pyrotechnic state. Unless additive 42 experiences such an excessive power signal it remains inert. Upon instance of power signal 44 of sufficient strength that it exceeds the maximum capacitor 40 rating, the power signal will be directly transmitted along 36 as to impinge on cladding 42 in a manner that will now exceed its pyrotechnic transition level causing it to vaporize and homogeneously release an enormous amount of thermal energy into 34. This near-instantaneous release of said energy by additive 42 causes a similar near-instantaneous activation of shape memory alloy 34. Due to the taut connection between ball lock pin 17 and release actuator 22, must similarly cause near instantaneous release of latching mechanism 31. This therefore allows the primary actuator 13 to also near-instantly relieve its pre-tension upon such an excessive energy event. From laboratory experimentations, using the design as herein described taken to practice, the resulting acceleration enhanced invention mechanism 5 provided a sufficient isolation gap 39 as to provide greater than 35 kV galvanic isolation between 12*a* and 12*b* within 20 ms. Performance evaluations of the invention when reduced to practice provided assurance of the invention achieving an AC-2 level of human safety under all operating conditions as to include a high voltage events of up to at least 35 kV.

Note, the method of accelerant activation of this embodiment is very distinct to all prior art of shape memory alloy actuation, including all prior art related to utilizing shape memory alloys for high voltage protection. Its introduction makes what has always been considered a relatively slow actuation mechanism when compared to other smart materials such as piezoelectric or magnetostrictive now effectively instantaneous.

Note that the description of the embodiment of the invention herein is not restricted to aluminum-nickel Nano-Foil powder, strip, or wire. Other similar materials that can similarly be used as accelerants 42 include certain pyrogens, titanium-boron, and aluminum-palladium.

There is a trade between the length of the release actuator 22 and the distance over which ball lock pin 17 must traverse in order to release (unlock) latching mechanism 31. Because suitable alloys such as SMA and superelastic materials of which release actuator 22 is comprised exhibit limited travel under excitation, it is therefore important to design the latching mechanism 31 to maximize holding force on primary actuator 13 while minimizing the travel distance necessary to release latching mechanism 31. FIGS. 7A-7C depict a latching assembly 31 comprising a distributed ball/cavity implementation of the pin-ball lock receiver 15 and locking pin 17. The locking pin embodiment 55 of the lock pin barrel of 17 now incorporates multiply distributed small protrusions, or balls 57 that are of form fit to matching multiple small cavities 60 in the pin-ball lock receiver 15. In the locked configuration, balls 57 are all captured by their corresponding acceptance cavities 60 as to form a unifying locking structure 31. Application of sufficient axial force when actuator 22 is excited will cause an axial motion of release barrel 15 in the direction of endcap 12b. Importantly, because of the size reduction under a distributed geometry of assembly 31, the traverse distance only need by small in order to release (unlock) latching mechanism 31.

The voltage interrupt assembly here described can be implemented by other means than utilization of springs as the primary actuator 13. An example alternate embodiment employs a dual opposing pair of stretchable bands 52a and 52b as illustrated in FIG. 8A. These bands are configured with the propensity to contract in opposite axial directions. These primary retraction actuators 52a and 52b can be comprised of any device that is extensible under tension and will undergo rapid and significant length reduction upon removal of said tension. Suitable devices include steel, glass fiber reinforced polymer, and thermoplastic springs. Flexible bands that provide suitable recovery without causing them to go into their plastic region can also be employed. Primary actuators 52a and 52b are held under tension by a latching mechanism 48 wherein it can be released in an ultrafast manner should either voltage or current exceed the capabilities of a suitably selected in-line high pass filter 40. Retraction actuators 52a and 52b that reside within cavities 20a and 20b respectively and are constrained by catches 24a/28a and rigid studs 51b/51b respectively in such a manner as to cause a pre-tension on bands 52a and 52b. Depending upon the selection of materials for band 52a and 52b, catches 24a/28a and studs 51a/51b may be either conductive of non-conductive.

In accordance with an aspect of this embodiment, latching mechanism 48 includes a symmetric and separated pair of individual ball lock pin assemblies 49a and 49b that normally form a pair of pin-lock assemblies with ball pins 22a, and 22c that are symmetrically disposed along stud 51a and that rigidly connect 51a to 49a and similarly ball pins 22b, and 22d that are symmetrically disposed along stud 51b and that rigidly connect 51b to 49b. The symmetric pin-ball lock assembly rigidly connecting stud 51a to 51b is comprised of conductive materials selected to optimize the preloading condition on flexbands 52a and 52b. During normal operation, this symmetric pin-ball lock assembly is in locked position and electrically connected to the conductive flange 21 and conductive connector 14 as to provide a high frequency conduction path between endcaps 12a and 12b.

Subsequent to an onset high energy event that exceeds the in-line high voltage blocking capacitor rating of band pass filter 40, the high energy signal will traverse from endcap 12a to latching mechanism 48 that is designed to then immediately release upon impingement of such a high power electrical signal. Upon release of latching mechanism 48 from its lock position, the flexbands will immediately begin recovery of their pre-stress as to induce axial motion of 51a, 22a, 22c and 49a towards endcap 12a and axial motion of 51b, 22b, 22d and 49b towards endcap 12b thereby creating an insulation gap 39 shown in FIG. 8B.

Figure 9:
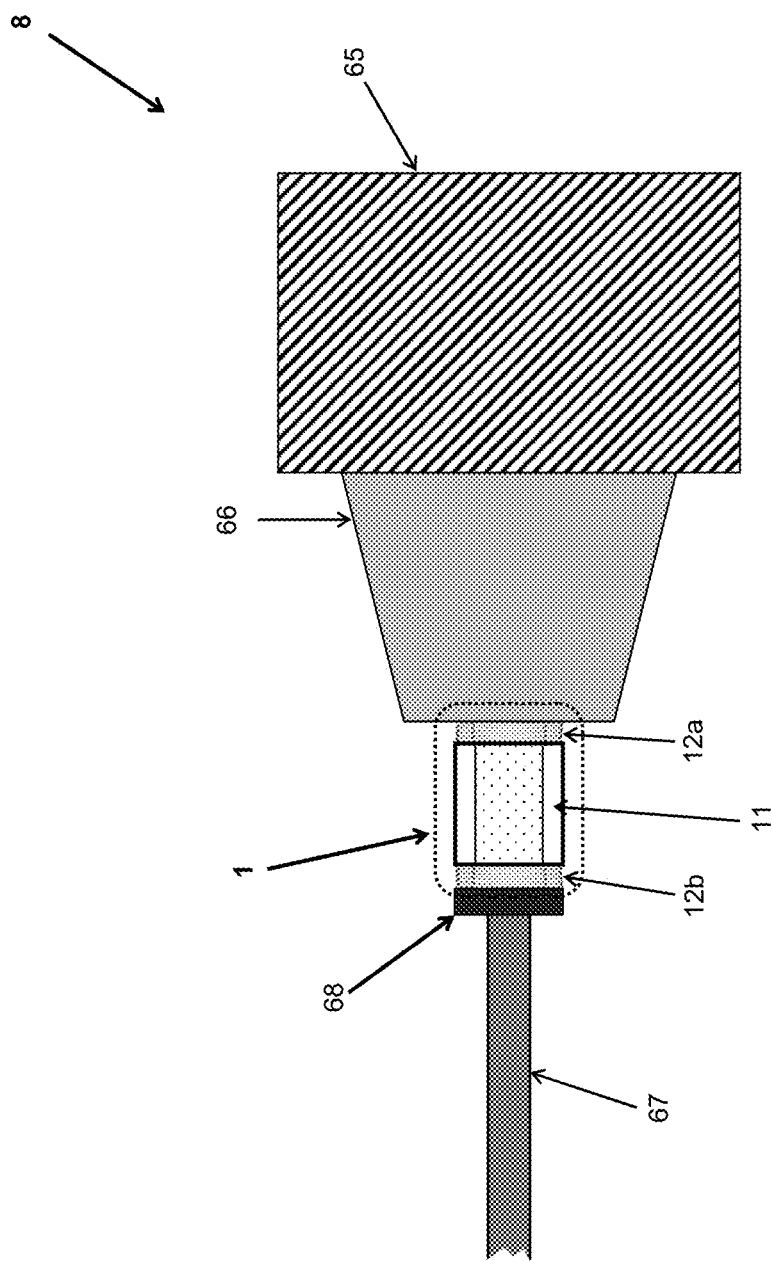
FIG. 9 depicts an embodiment of the voltage interrupt assembly installed between a transceiver connection and an antenna conductor (monopole, dipole, etc.) rod.

FIG. 9 illustrates a voltage interrupt assembly according to the invention installed as to provide a near-instantaneous high voltage protection capability for certain antennae, such as monopole or, dipole antennae to protect both human and transceiver equipment. The voltage interrupt assembly described herein may be installed between a strain relief mechanism 68, which itself is coupled to an antenna rod 67, and a transceiver connector 66. The quick release screw connectors (endcaps) 12a and 12b of FIG. 5 enable a rapid disconnect from transceiver connector 66 and relief mechanism 68. This allows for ready disposal and replacement of the voltage interrupt assembly as needed in event of damage due to an inadvertent or unexpected high voltage conduction by the antenna rod 67.

We claim:

1. A voltage interrupt assembly for a conductive device comprising:
   a first conductive end cap;
   a second conductive end cap axially displaced from said first conductive end cap;
   a conductive latching mechanism disposed between said first and second conductive end caps;
   a conductive connector electrically connected to said first conductive end cap at a first end and to said conductive latching mechanism at a second end;
   a pre-tensioned retraction mechanism disposed between said first conductive end cap and said conductive latching mechanism;
   a release actuator disposed between said conductive latching mechanism and said second conductive end cap;
   a conductive flange disposed about said release actuator, said conductive flange being electrically connected to said conductive latching mechanism and said second conductive end cap and said conductive flange allowing substantially unimpeded freedom of axial motion of said release actuator.

2. The voltage interrupt assembly of claim 1 further comprising a cavity disposed between said first and second conductive end caps, wherein said conductive connector and said conductive latching mechanism and said pre-tensioned retraction mechanism are disposed within said cavity.

3. The voltage interrupt assembly of claim 1 wherein said retraction mechanism is coated with a non-conductive coating.

4. The voltage interrupt assembly of claim 1 wherein said conductive latching mechanism includes a ball lock pin assembly comprising a female receiver barrel engaged with a male ball lock pin.

5. The voltage interrupt assembly of claim 1 wherein said release actuator displaces in the direction of said second end cap upon receipt of a signal of equal to or less than 200 MHz and greater than or equal to 600V, such displacement causing said male ball lock pin to disengage from said female receiver barrel, said pre-tensioned retraction mechanism thereby displacing said receiver barrel in the direction of said first end cap thereby creating an insulation gap between said female receiver barrel and said male ball lock pin.

6. The voltage interrupt assembly of claim 1 further comprising a low pass filter disposed in series between said first end cap and said conductive connector.

7. The voltage interrupt assembly of claim 1 wherein said low pass filter comprises a capacitor.

8. The voltage interrupt assembly of claim 1 wherein said pre-tensioned retraction mechanism includes a metal spring.

9. The voltage interrupt assembly of claim 8 wherein said conductive connector includes a conductive braid connected between said first end cap and said latching mechanism.

10. The voltage interrupt assembly of claim 9 further comprising a conductive housing in which said conductive braid and said metal spring are disposed.

11. The voltage interrupt assembly of claim 9 further comprising a hollow cylinder mechanically coupled to said latching mechanism, said hollow cylinder housing said conductive flange which includes a shape memory alloy having a transition temperature T and a conduction wire, the conductive flange being attached to said second end cap, wherein the shape memory alloy shrinks in length when its temperature exceeds transition temperature T.

12. The voltage interrupt assembly of claim 11 further comprising an accelerant disposed between the shape memory alloy and the conductive wire.

13. The voltage interrupt assembly of claim 12 wherein said accelerant includes NanoFoil powder.

14. The voltage interrupt assembly of claim 12 wherein said accelerant includes at least one of a pyrogen, titanium-boron, and aluminum-palladium.

15. The voltage interrupt assembly of claim 1 wherein said conductive latching mechanism includes a lock pin barrel including a plurality of protrusions disposed thereon and a lock pin barrel receiver including a plurality of cavities configured to mate with said plurality of protrusions of said lock pin barrel.

16. The voltage interrupt assembly of claim 1 wherein said pre-tensioned retraction mechanism includes devices that are extensible under tension and that undergo rapid and significant length reduction upon removal of tension.

17. The voltage interrupt assembly of claim 16 wherein said retraction mechanism includes at least one of steel band and glass fiber reinforced polymer.

18. The voltage interrupt assembly of claim 16 wherein said release actuator includes at least one of steel band and glass fiber reinforced polymer.

19. The voltage interrupt assembly of claim 1 wherein said release actuator includes devices that are extensible under tension and that undergo rapid and significant length reduction upon removal of tension.

* * * * *